United States Patent
Nesbitt

Patent Number: 6,150,927
Date of Patent: *Nov. 21, 2000

[54] ANTI-VANDALISM DETECTOR AND ALARM SYSTEM

[75] Inventor: Bryce Nesbitt, Berkeley, Calif.

[73] Assignee: Nextbus Information Systems, LLC, Emeryville, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/050,774

[22] Filed: Mar. 30, 1998

[51] Int. Cl.[7] .................................................. B60R 25/10
[52] U.S. Cl. .......................... 340/426; 340/429; 340/566; 307/10.2; 180/287
[58] Field of Search ..................................... 340/426, 429, 340/545.4, 545.9, 545.1, 566; 307/10.2; 180/287

[56] References Cited

U.S. PATENT DOCUMENTS

| | | |
|---|---|---|
| 3,863,250 | 1/1975 | McCluskey . |
| 4,054,867 | 10/1977 | Owens ..................................... 340/436 |
| 4,073,094 | 2/1978 | Waltz . |
| 4,091,660 | 5/1978 | Yanagi . |
| 4,709,513 | 12/1987 | Tingley . |
| 4,837,558 | 6/1989 | Abel et al. . |
| 4,845,464 | 7/1989 | Drori et al. . |
| 4,853,677 | 8/1989 | Yarbrough et al. . |
| 4,897,630 | 1/1990 | Nykerk ..................................... 340/426 |
| 5,120,980 | 6/1992 | Fontaine ................................. 307/16.1 |
| 5,192,931 | 3/1993 | Smith et al. . |
| 5,289,159 | 2/1994 | Iwata ....................................... 340/429 |
| 5,438,317 | 8/1995 | McMaster . |
| 5,450,061 | 9/1995 | McMaster . |
| 5,528,220 | 6/1996 | Woods . |
| 5,543,783 | 8/1996 | Clark et al. .............................. 340/550 |
| 5,552,770 | 9/1996 | McMaster . |
| 5,598,141 | 1/1997 | Grasmann et al. ...................... 340/426 |
| 5,686,909 | 11/1997 | Steinhauser ............................. 340/984 |
| 5,712,620 | 1/1998 | Greenwood .............................. 340/541 |

Primary Examiner—Daniel J. Wu
Assistant Examiner—Anh La
Attorney, Agent, or Firm—Philip A. Dalton; Crosby, Heafey, Roach & May

[57] ABSTRACT

An anti-vandalism detection and alarm system is disclosed for detecting and reporting the scratching of relatively hard materials such as glass and plastic which generate characteristic sound or vibration frequencies during scratching, and for detecting and reporting the cutting and slashing of relatively soft materials such as fabric, leather and plastic.

8 Claims, 4 Drawing Sheets

ANTI-VANDALISM DETECTOR AND ALARM SYSTEM

1. BACKGROUND OF THE INVENTION a. Field of the Invention

The present invention relates generally to anti-vandalism detectors and, in particular, to systems and methods for detecting breakage and defacing of materials such as glass and plastic.

b. Current State of the Relevant Field

The direct annual costs of vandalism run in the billions of dollars per year in the United States alone. Conventional security techniques, such as direct lighting and intruder alarms, are often used to deter vandalism. However, there are many locations such as public transit vehicles, where such conventional techniques are ineffective or impractical. Conventional techniques used to protect glass and plastic windows and public seating are summarized below.

i. Glass Anti-Vandalism Techniques

A common component of a security system is a glass-break detector. Older models relied on mechanical disturbance or vibration. Newer models are available that use digital signal processing to protect a whole room by listening for the sound of breaking glass. However, the sound frequencies generated by breaking glass are rather indistinct. As a result, even these newer sensors are vulnerable to false alarms from a variety of sources such as music and must be tuned carefully to detect all possible glass breakage events.

Glass windows can be scratched by a vandal using glass-cutting tools, available for a few dollars at many hardware stores. Often the glass is ruined. Expensive professional services are available to polish out such scratches, provided that the glass started out thick enough, has enough remaining thickness and under many circumstances is not of the automotive safety type. Much research has focused on films or coatings that can be replaced to restore a scratched pane to original condition.

ii. Plastic Anti-Vandalism (Scratch) Detection

Many applications use a variety of non-glass panes for example plastic such as Lexan™. The advantage of plastic panes is shatter resistance. However, plastic panes are even more vulnerable to scratching than glass. A simple key can leave a deep mark. Scratch detection is difficult because the associated sound frequencies are even less distinct than those associated with glass scratching.

iii. Seat Slash Detection

There is no cost effective system for sensing the vandalism, such as by slashing or cutting, of public seating in buses, bus stops and elsewhere. Perhaps as a result, public seating is often made from hard, easy to clean and vandalism-resistant materials such as reinforced plastic.

2. SUMMARY OF THE INVENTION

In one aspect, the present invention is embodied in a system for detecting the act of glass scratching, comprising: a sensor microphone attached to a body of glass for generating a characteristic output signal when the glass is scratched; one or more alarms; and an electronic circuit responsive to the characteristic output signal for activating the alarms. In another aspect, the detector system is resident in a vehicle, the sensor is attached to a window of the vehicle, and the electronic circuit activates one or more alarms on the vehicle and one or more remote alarms for initiating a response by police, security and the like. Preferably, a sufficient number of windows are supplied with sensors to deter glass scratching on the bus.

In another, method aspect, the present invention is embodied in a method for detecting the act of glass scratching, comprising: responsive to vibrations produced in a body of glass when the glass is scratched, generating an electrical signal characteristic of the vibrations; and, responsive to the characteristic signals, activating an alarm.

In yet another aspect, the present invention is embodied in a seat slash detector system, comprising a conductor layer situated in a seat adjacent a surface of the seat; an alarm; means connected to the conductor layer and establishing a circuit path through the conductor layer for generating a characteristic output signal when the conductor layer is cut; and an electronic circuit responsive to the characteristic output signal for activating the alarm.

In yet another, method aspect, the present invention is embodied in a method for detecting slashing of the cover of a seat, comprising: responsive to resistance changes in a conductor layer adjacent a seat cover when the seat cover is cut, generating an electrical signal characteristic of the change in resistance; and, responsive to the characteristic signal, activating an alarm.

As summarized in this section and described in detail below, the present invention is directed to novel electronic vandalism detectors and systems. The specific and targeted signals from these detectors can be fed into conventional security systems, or can alert responsible personnel via a pager or other means. Direct intervention is possible before damage occurs, vandalism trends can be tracked and most importantly repeat offenders can easily be identified and apprehended. Although the sensors are all particularly applicable to public transit vehicle use, for example, to windows, seats and other applications and other sectors of the economy can benefit from their use as well. The above and other embodiments of the present invention are described in the specification drawings and claims.

3. BRIEF DESCRIPTION OF THE DRAWINGS

The above and other aspects of the invention are described below in conjunction with the following drawings.

FIG. 1 schematically depicts an electronic anti-vandalism system embodying the present invention.

FIG. 2 schematically depicts a sensor and digital signal processing circuit used in one embodiment of the present invention.

4. DETAILED DESCRIPTION OF THE PREFERRED EMBODIMENT(S)

a. Electronic Anti-Vandalism Defacement Detector System

Figure 1:
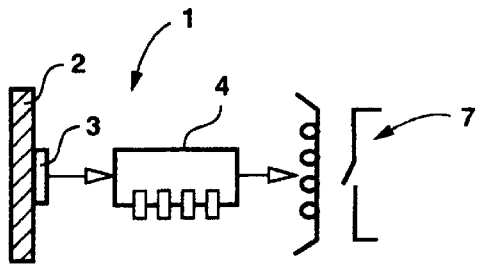

FIG. 1 depicts an electronic anti-vandalism system in accordance with the present invention. The illustrated system includes a sensor 3 for generating output signals characteristic of vibrations associated with acts of vandalism such as the scratching or cutting of materials 2. In addition, the system comprises one or more reporting devices 7; and an electronic circuit 4 responsive to the characteristic output signals for activating the reporting devices. As used here, the phrase "reporting devices" includes conventional alarms, display and recording devices, including lights; sirens; audio signals; visual displays; silent alarms; cameras; video and audio recorders; and remote devices such as telephones and pagers, etc.

The scratch detector system can be used in general to protect materials which transmit characteristic vibrations when defaced or scratched. Suitable materials include plastic; fiberglass; metals, including painted metals; and metal alloys and compounds such as stainless steel.

The scratch detector system can be used to protect many kinds of bodies of material and in many applications, for example: windows in general; store windows; vehicles in general; public transit vehicles; mirrors in general; restroom mirrors; decorative glass surfaces; elevator interiors; bus shelters; advertising signs and display boxes; outdoor electronic signs; and anywhere glass or other suitable material is subject to being damaged.

b. Scratch Detector System for Hard Materials (Glass Panels)

Figure 2:
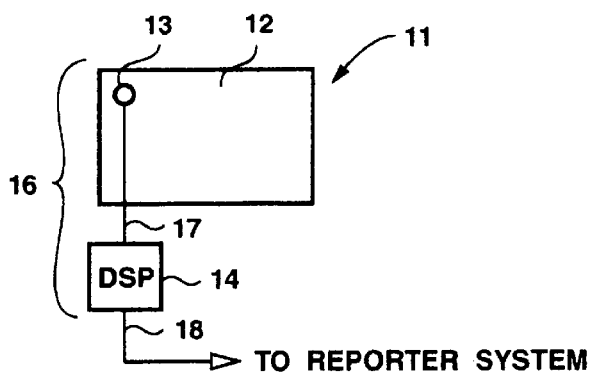
Figure 6:
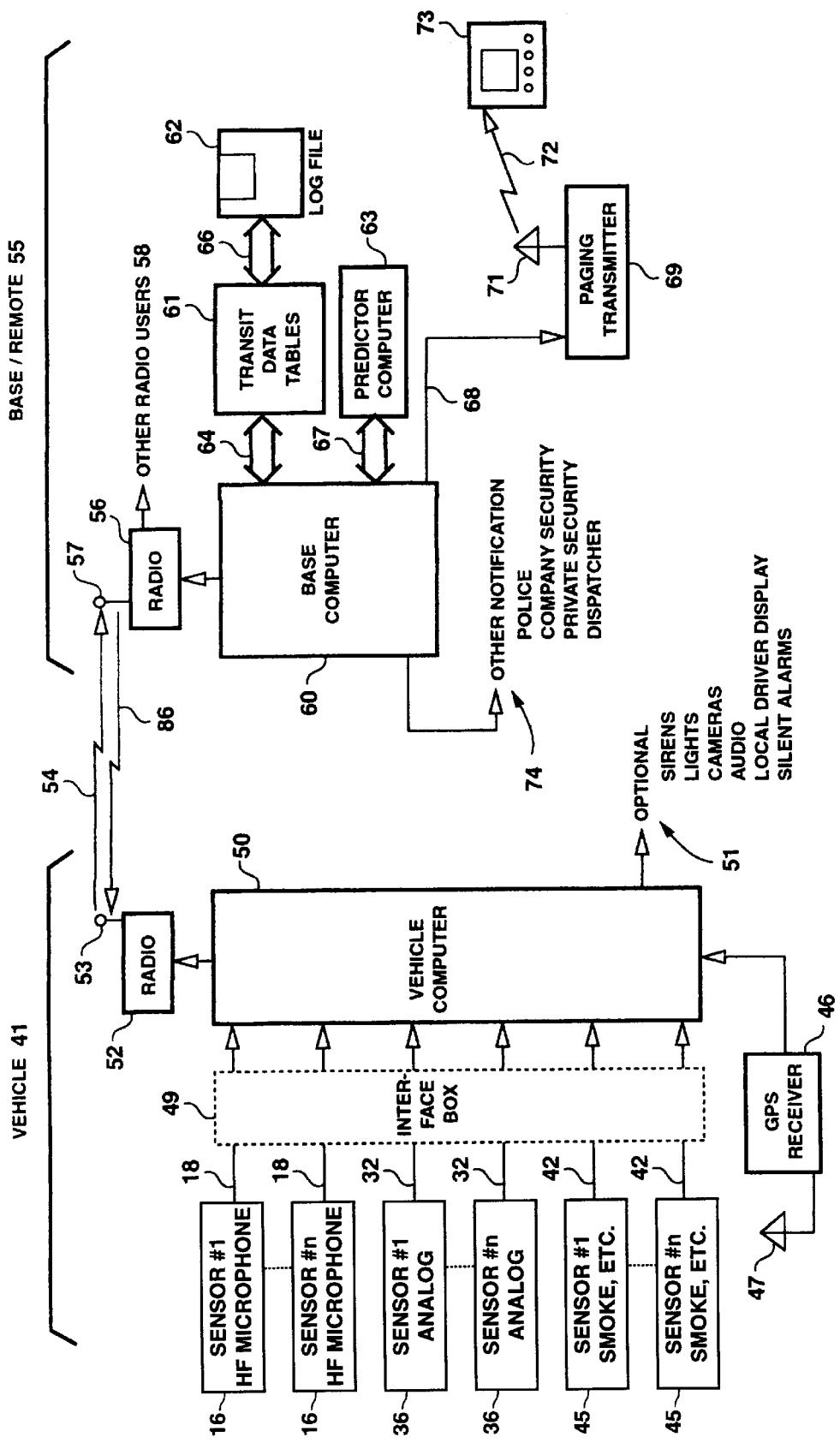
FIG. 6 is a block diagram of a comprehensive sensing and reporting system for vehicle seats and windows.

FIG. 2 depicts one example of an application of the scratch detector system of the present invention. The exemplary system 11, a preferred embodiment, is adapted for detecting the act of scratching or cutting of panes or panels 12 of hard-surface materials, typically glass or plastic. The system 11 comprises a high frequency microphone sensor device 13 positioned adjacent to the body 12 of material and preferably attached to the surface of the body of material by joining means such as epoxy. The output of each sensor 13 is connected to a digital signal processing circuit 14 (DSP), the output of which is connected to a reporting system. For example, FIG. 6 illustrates one suitable reporting system in which the sensor 13 and the digital signal processing circuit 14 (collectively identified by the reference numeral 16) are connected to a processor or computer 50 which, in turn, is connected to one or a plurality of reporting device(s).

c. Slash Detector System for Hard Materials (Seats)

Figure 3:
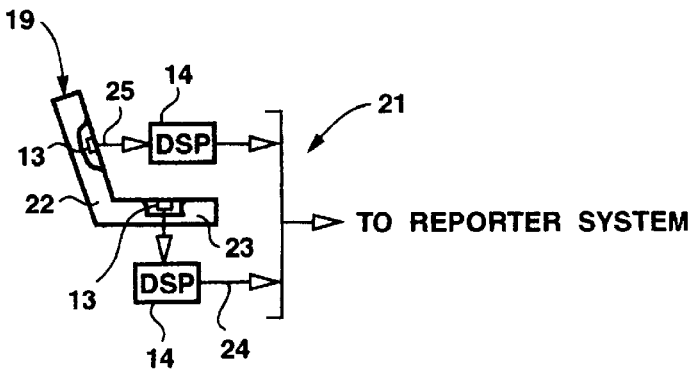
FIG. 3 is an enlarged view of a vehicle seat, depicting the location of anti-vandalism, scratch sensors in accordance with the present invention.

FIG. 3 illustrates the application of the present invention to detect the act of cutting or slashing of bodies 19 of hard-surface materials, illustratively seats or chairs comprising hard-surface plastic material. The illustrated system comprises a high frequency microphone sensor device 13 positioned adjacent to the body of material and preferably attached to the back 22 and/or the underside 23 of the plastic seat. Each sensor 13 is connected to a digital signal processing circuit 14, which in turn is connected to a reporting system, such as that depicted in FIG. 6.

d. Slash Detector System for Soft Materials (Seats)

Figure 4:
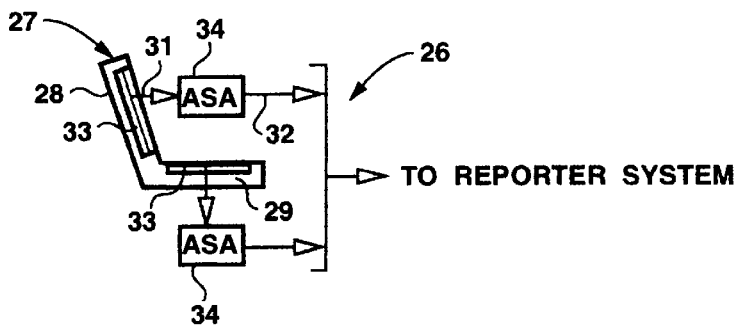
FIG. 4 is an enlarged view of a vehicle seat, depicting the location of anti-vandalism, slash sensors in accordance with the present invention.

FIG. 4 illustrates the application of the present invention to detect the act of defacing soft materials. The illustrated application is to seats or chairs 27. However, this system 26 is applicable to essentially any material where it is desirable to protect the material from defacement which breaches the physical integrity of the material, for example cutting or tearing. The illustrated seats 27 comprise a frame of plastic or wood or other suitable material having seatback cushion or insert 28 and seat cushion or insert 29 of soft material such as fabric, leather or plastic. The detector system 26 comprises a resistive sensor 33 inserted or formed in the back 28 and seat section 29. The seat 27 is depicted with sections of the sides cut away to reveal the mounting of the sensors 33 in the back and seat. The sensors 33 are connected to associated analyzing circuits 34, which in turn are connected to a reporting system, such as that depicted in FIG. 6.

Figure 8:
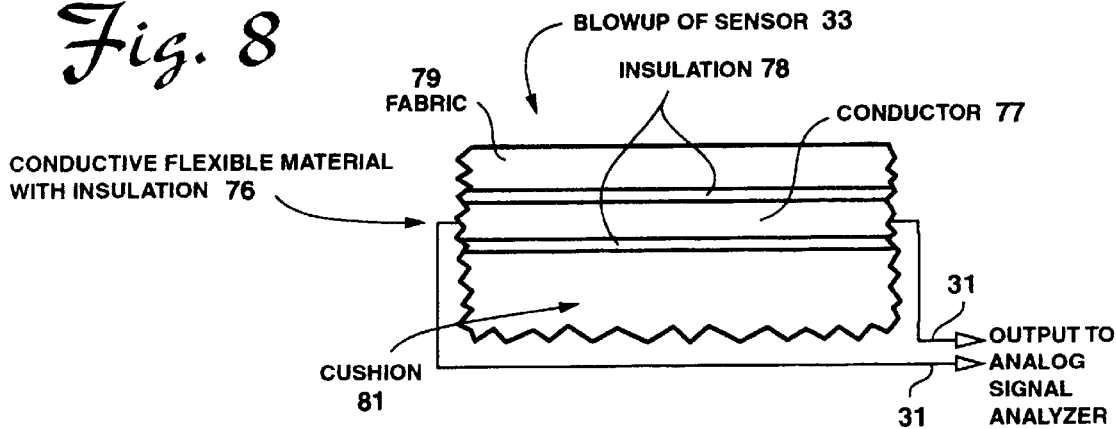
FIG. 8 is an enlarged cross-section of a region of the seat of FIG. 4, illustrating the placement of and connections to the sensor.
Figure 9:
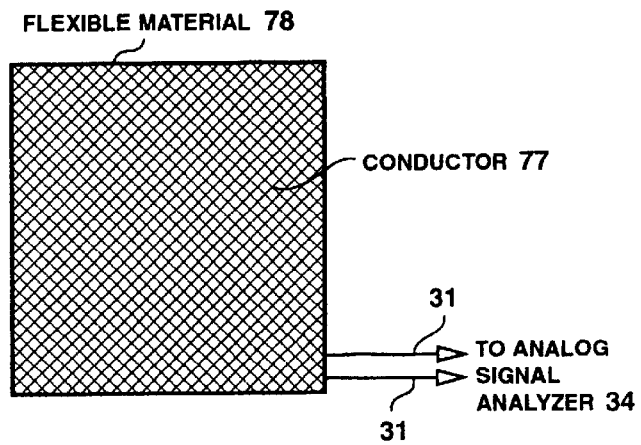
FIG. 9 is an enlarged schematic representation of the seat sensor material.
Figure 10:
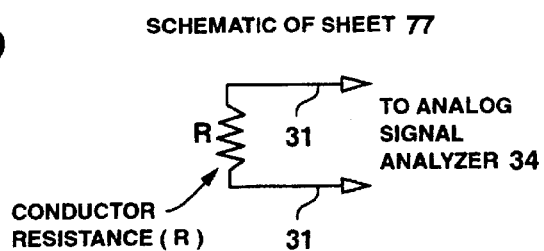
FIG. 10 is a simplified circuit schematic of the seat sensor.

Referring to the illustration of the seat 27 in FIG. 4 and to the schematic representation of the sensor conductor array in FIG. 8, in a presently preferred embodiment the sensors 33 comprise a sheetlike composite of flexible conductive material 76 which is formed by an array of closely woven conductors 77, covered by flexible insulation material 78. The composite 76 is inserted or formed between the protected surface layer 79 of fabric, leather, plastic, etc. material and the cushion 81. The insulation 78 can be layers formed over the conductor array 77 or can be a flexible matrix within which the conductor array is embedded. In either case, preferably thin layers of the insulator material 78 cover the top and bottom of the conductor array 77, to electrically insulate the conductor array from the seat. Alternatively, the sensors can be metal fibers interwoven in the vulnerable layer 79. As shown in FIGS. 8–10, the sensor is connected by wiring 32 to the analog signal analyzer ASA circuit 34, which is connected to the input of the on-board computer 50, to permit monitoring the abrupt change in resistance in the sensor current which results from tearing or cutting the seat 27.

The slash or cut detector system can be used in many applications, for example: public seating in general; vehicle seating; transit waiting area seating (for example, California's Bay Area Rapid Transit system); commercial and government waiting rooms; and anywhere vulnerable soft material such as fabric, leather and plastic is subject to being vandalized.

e. Electronic Anti-Vandalism Detector System for Vehicle Windows

Figure 5:
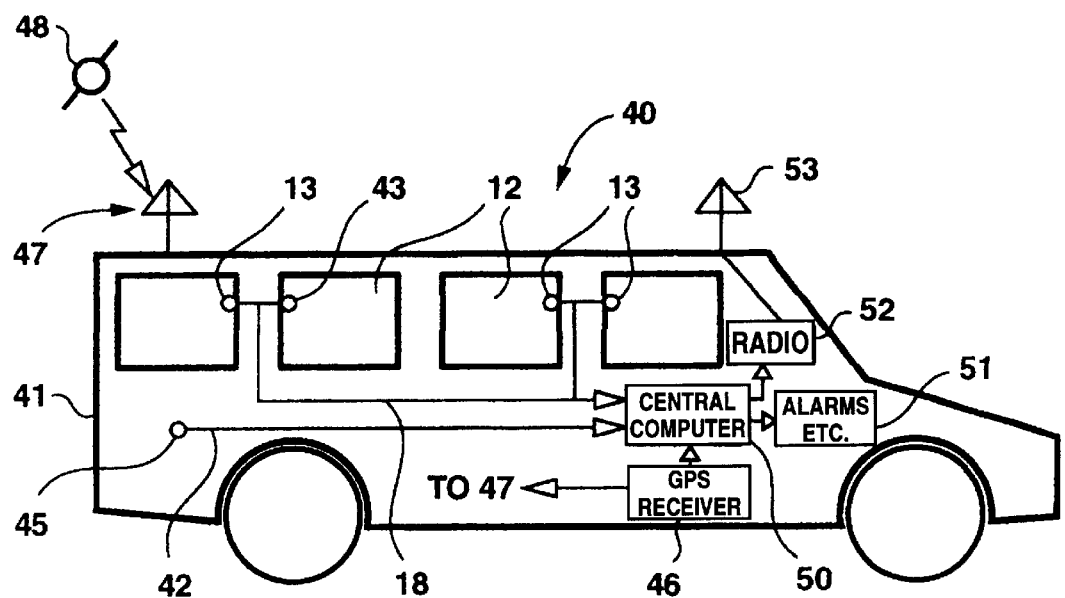
FIG. 5 depicts a vehicle which includes an anti-vandalism system for protecting against scratching of vehicle windows.

FIG. 5 depicts a vehicle 41, illustratively a bus, which includes an anti-vandalism detecting system 40 for protecting glass panes such as the vehicle windows 12 from vandalism, specifically scratching. High frequency microphone sensors 13 are mounted on selected windows, for example using epoxy adhesive. Typically each sensor 13 is connected by wiring 18, which is routed individually or by wiring harness, to a digital signal processing circuit 14, FIG. 6, which preferably is connected to an interface box 49, which in turn is connected to on-board computer 50 for monitoring the output signals generated by the DSP circuit. Referring also to FIG. 6, for convenient representation, the sensor circuit comprising sensor 13 and associated digital signal processing circuit 14 is designated 16. Typically the DSP 14 is a conventional inexpensive digital signal processing integrated circuit. The digital signal processing circuit 14 convert the analog frequencies in the microphone sensor output signal to digital signals which also are characteristic of the vibrations in the glass caused by the act of scratching the glass. Thus, the microphone sensor and the DSP circuit listen for the sound of glass scratching and, as described below, trigger the computer 50 to alert and activate the security system.

The vibrations generated by a hard object scratching glass are characterized by a distinct, narrow frequency and thus the characteristic output signal from the sensor circuit 16 can be easily detected. In one example, the time and frequency domain plots of a common glass scratcher on common window glass exhibit a series of pulses, each of which starts at roughly 10 KHz and decays rapidly to near zero. Time and frequency domain plots for breaking glass are characterized by considerably lesser distinctiveness of these events in comparison to the plots associated with glass scratching. The glass scratching frequency spectrum is unlike common automotive vibrations, speech, wind or other mechanical vibrations. Because of the distinct nature of the signal, it is uniquely applicable to moving vehicles, making the technique ideal for transit vehicle use.

In contrast to those detectors which detect signals through the air, preferably, as indicated above, the sensors 13 preferably are mounted directly on the glass to be protected. This is because of the lower volume of glass scratching. The direct mounting has the advantage of conducting energy to the microphone sensor directly through the vibration of the glass. Also, this approach provides natural attenuation of air-based noise.

Referring again to FIG. 6, upon detection of the distinct characteristic output signal frequencies from the digital signal processing circuit 14, the computer 50 initiates predetermined operation of local reporting system 51, including activating one or more of sirens, lights, audio displays and visual displays. The devices can be public and/or directed to employees only, including silent alarms. These include audio messages directed only to the vehicle personnel, warning messages on displays at the dashboard or console, etc. In addition, the reporting system can include recording devices such as cameras, video recorders and audio recorders, to provide a record and evidence of the vandalism.

Referring further to FIGS. 5 and 6, the vehicle 41 includes a radio 52 which is connected to and controlled by the computer 50 and is connected to an antenna 53 for broadcasting selected information to a radio 56 at a base or remote station 55. Preferably, the vehicle 41 also includes a receiver 46 for receiving via antenna 47 the precise vehicle geographic location from the US government-installed global positioning system satellite network (GPS network), which is designated generally by the reference numeral 48. FIG. 5. In the event the computer 50 determines an act of vandalism has occurred based upon the signals emitted by a sensor 13. the computer automatically activates the local reporting system 51 as described above, and also automatically activates the radio 52 to broadcast the alarm report for reception by base radio 56. Typically the broadcast information includes the vehicle identification and geographic location and the sensor identification and on-board location.

The base station computer 60 is connected to radio 56 and includes resident memory or is connected to memory containing relevant information regarding the transit system and the particular vehicle. For example, the base computer 60 may be part of or be connected to the NextBus™ vehicle monitoring and information system described in copending patent application U.S. Ser. No. 08/696,811, filed Aug. 13, 1996, which application is hereby incorporated by reference. The NextBuS™ system includes memory 61 containing transit data tables. These are tables of information regarding the route schedule and stops for each vehicle in the system, the predicted arrival times at upcoming stops based upon normal and unusual conditions which affect transit time, etc. The NextBus™ system also includes a predictor computer 63 which uses information regarding normal and unusual conditions to continuously update the transit data tables. As shown in FIG. 6, the base computer 60 is connected to the memory 61 and to the predictor computer 63 and thus has access to this real time and predicted information regarding the location of the vehicles in the system including vehicle 41. From this real time and transit data table and the alarm report from vehicle 41, the computer 60 knows the identification and present location of the vehicle 41, plus the route of the vehicle, and the expected arrival of the vehicle at known "landmarks" such as upcoming transit stops, intersections, etc.

The base computer 60 is connected to a hard-wired or broadcast system 74 to stationary and portable receivers such as those carried by police and transit authority personnel and vehicles. In addition, and by way of specific example, the computer 60 is connected to a paging transmitter 69 having an antenna 71 for broadcasting relevant information to pagers 73 held by security personnel and the like. The pagers provide these personnel selected information such as vehicle identification, the time of the alarm, the type of vandalism (for example, window defacing), the onboard location, and information useful in intercepting the vehicle, including the vehicle route and possible intercept points such as upcoming intersections and vehicle stops.

Referring further to FIGS. 5 and 6, in addition to the local and remote reporting capability, the system 40 can include automatic feedback capability, controlled by computer 60, which transmits selected aspects of the above-described information via base radio 56 to vehicle radio 52. This information contains control signals for activating appropriate on-board reporting devices such as a driver display or headset and status information such as the type of response, the expected point of intercept of the vehicle by security forces and any special instructions such as suggested action to be taken.

f. Other Microphone Sensor Applications

The sensing technique and system described above are applicable for detecting scratching of any material so long as the vibrations caused by scratching the material are sufficiently unique relative to background noises to permit detection. Examples of suitable materials in addition to 10 glass include plastics, including fiberglass, and stainless steel. For example, the spectrum of the time and frequency domain plots for a key scratching a Lexan™ panel is less distinct than for glass and, thus, in noisy applications, such as moving vehicles, a higher error rate can be expected than with glass scratch detection. However, in fixed applications, detection should be adequate even with a simple microphone detector. Furthermore, a higher error rate can be tolerated because, although plastic panels or panes are shatter resistant, they are even more vulnerable to scratching than glass.

The systems 11 (FIG. 2), 21 (FIG. 3) and 40 (FIG. 5) can be used to detect scratching of windows, seats and a multitude of other articles and bodies 12, transparent or not, which are made of glass, plastic and other suitable hard-surface material, simply by attaching the detector system sensors to the articles or bodies to be protected, and using the system as described above. Obviously, the system can be modified, for example, by using different reporting devices. Each system may include a microphone sensor, a digital signal processing circuit, and one or more reporting devices such as alarms or indicators which are controlled by the computer for warning regarding the occurrence of scratching.

g. Electronic Anti-Vandalism Detector System for Vehicle Seats

Figure 7:
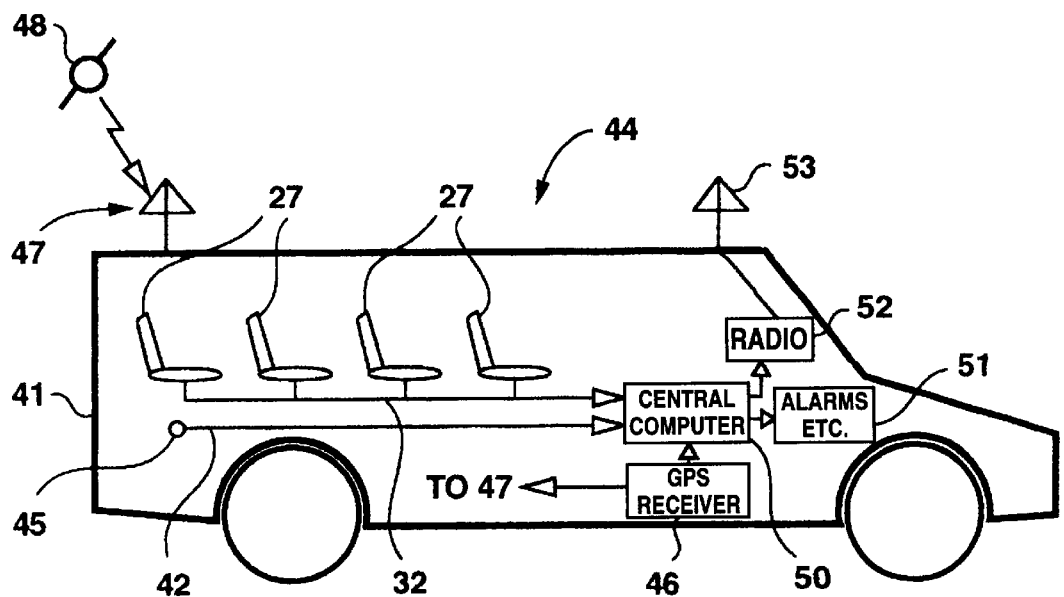
FIG. 7 depicts a vehicle which includes an anti-vandalism sensing system for protecting against slashing of vehicle seats.

Referring to FIG. 7, there is shown another embodiment of the present invention, an anti-vandalism sensing system 44 for protecting vehicle seats. One or more sensors 33, FIG. 4, are mounted to or incorporated in each protected seat 27 of the bus 41, and typically are connected by wiring 32, routed individually or by wiring harness to the on-board computer 50 for monitoring the output signals generated by the sensors. Referring also to FIG. 6, for convenient reference, the sensor circuit comprising sensor 33 and analog signal analyzer circuit 34 is designated 36.

Typically the computer 50 monitors the signals from the analog analyzing circuit 34 for the purpose of detecting sudden changes in the resistance of the seat sensors. The resistance of the seat sensors changes gradually over time as the material ages, and such change is readily taken into account. Upon detection of a signal change characteristic of a tear or a cut being made in a seat, the computer 50 initiates operation of the local and remote reporter devices, as described above regarding FIGS. 5 and 6. Please note, computer 50, reporting devices 51, GPS receiver 46, radio 52, base station 55 and other components used in this seat alarm system 44 can be the same as or similar to those used in the window alarm system 40. Furthermore, for vehicles which include both seat and window alarm systems, preferably the systems are integrated and the same computers, reporting devices, radios, etc. may serve both systems and the component connections 18, 32 may be routed in the same wiring harness or network.

Referring to FIGS. 5 and 6, the individual and combined window and seat alarm systems may include other types of sensors 45, for example smoke detectors, which may be integrated into the window alarm systems and the seat alarm systems.

As described above, systems which use the present invention can incorporate numerous different types of alarms, displays, etc for permitting rapid response to the event which the system protects against. After the effectiveness of the system becomes known to the public, it may be possible to provide a significant deterrent with only a small percentage of actual live detectors 13, FIG. 5, and many inexpensive dummies 43. Also, it may be possible to include slash sensors 33 in only a small percentage of the seats 27, FIG. 7. The following are examples of specific types of conventional alarms and actions, which are effective in stopping the undesirable event such as scratching or slashing, and preventing or diminishing future occurrences:

1. Bright lighting or sirens can be directly activated.

2. A silent alarm can alert maintenance or security personnel, who may be able to directly apprehend the vandals. Personnel could carry an alphanumeric pocket pager which shows the location and type of alarm at each event. The person can then decide on appropriate action.

3. Cameras can be activated, photographing the act. Repeat offenders and patterns can be identified and apprehended.

4. In the case of transit vehicles, a silent indicator can alert the driver, who can take action, directly or indirectly. On transit systems with security cameras, images can be stored and forwarded to dispatch for action (repeat violators can easily be identified and apprehended, as they will often ride regular routes).

5. On transit systems with Automatic Vehicle Location and silent alarms, the vandalism alarm can trigger a less serious silent alarm. The actual location of the vehicle, along with a prediction of where it is going, can be transmitted to security personnel. The security person can board the appropriate vehicle to either deter or apprehend the vandals.

The present invention has been described in terms of preferred and other embodiments. The invention, however, is not limited to the embodiments described and depicted. One familiar with the art to which the present invention pertains will appreciate the described embodiments that the present invention is applicable in general to anti-vandalism sensors for materials which have unique breakage, scratch, etc. patterns. The invention is defined by the claims appended hereto.

What is claimed is:

1. An anti-vandalism system for protecting a vehicle from window scratching and seat slashing, comprising: a plurality of first, microphone sensors attached to selected windows of the vehicle and, responsive to vibrations in a window when the window is scratched, generating an output signal characteristic of the vibrations; a plurality of digital signal processing circuits connected to the first sensors and, responsive to the characteristic output signal of the first sensors, generating a corresponding digital signal characteristic of the vibrations; a plurality of second sensors, each second sensor comprising a conductor layer mounted in a vehicle seat adjacent a selected surface of the seat and having resistance which changes when the conductor layer is cut; a plurality of analog signal analyzing circuits connected to the second sensors and, responsive to the change in resistance when a conductor layer is cut, generating an output signal characteristic of the change in resistance; a reporting device system comprising at least one reporting device; and a computer connected to the digital signal processing circuits and, responsive to the signal characteristic of the vibrations, activating the reporting device system, and the computer further being connected to the analog signal analyzing circuits and, responsive to the signal characteristic of the change in resistance, activating the reporting device system.

2. The anti-vandalism system of claim 1, wherein the reporting device system comprises at least one reporting device on board the vehicle.

3. The anti-vandalism system of claim 1, wherein the reporting device system comprises at least one reporting device remote from the vehicle; and radio means on the vehicle in communication with the remote reporting device for activating the remote reporting device.

4. The anti-vandalism system of claim 1, wherein the reporting device system comprises at least one reporting device on board the vehicle and at least one reporting device remote from the vehicle; and radio means on the vehicle in communication with the remote reporting device for activating the remote reporting device.

5. The anti-vandalism system of claim 1, wherein the reporting device system further comprises a paging system.

6. The anti-vandalism system of claim 2, wherein the reporting device system further comprises a paging system.

7. The anti-vandalism system of claim 3, wherein the reporting device system further comprises a paging system.

8. The anti-vandalism system of claim 4, wherein the reporting device system further comprises a paging system.

* * * * *